(12) United States Patent
Kiep et al.

(10) Patent No.: US 11,685,351 B2
(45) Date of Patent: Jun. 27, 2023

(54) REDUNDANT POWER SUPPLY FOR BRAKE SYSTEM

(71) Applicant: Infineon Technologies AG, Neubiberg (DE)

(72) Inventors: Andreas Kiep, Munich (DE); Johannes Huchzermeier, Munich (DE)

(73) Assignee: Infineon Technologies AG, Neubiberg (DE)

( * ) Notice: Subject to any disclaimer, the term of this patent is extended or adjusted under 35 U.S.C. 154(b) by 112 days.

(21) Appl. No.: 17/343,105

(22) Filed: Jun. 9, 2021

(65) Prior Publication Data

US 2022/0017053 A1 Jan. 20, 2022

(30) Foreign Application Priority Data

Jul. 17, 2020 (DE) .......................... 102020118987.7

(51) Int. Cl.
| | |
|---|---|
| *B60T 8/88* | (2006.01) |
| *B60T 13/74* | (2006.01) |
| *B60T 8/17* | (2006.01) |
| *B60T 17/22* | (2006.01) |
| *B60T 8/92* | (2006.01) |

(52) U.S. Cl.
CPC ............... *B60T 8/885* (2013.01); *B60T 8/17* (2013.01); *B60T 8/92* (2013.01); *B60T 13/74* (2013.01); *B60T 17/221* (2013.01); *B60T 2270/402* (2013.01); *B60T 2270/413* (2013.01); *B60T 2270/414* (2013.01)

(58) Field of Classification Search
CPC . B60T 8/885; B60T 13/74; B60T 8/17; B60T 2270/14; B60T 17/221; B60T 2270/402; B60T 2270/413; B60T 8/92
See application file for complete search history.

(56) References Cited

U.S. PATENT DOCUMENTS

| | | | | |
|---|---|---|---|---|
| 5,255,962 | A * | 10/1993 | Neuhaus ................. | B60T 8/321 701/76 |
| 8,548,708 | B2 * | 10/2013 | Strengert .............. | B60T 17/221 303/122.04 |
| 2008/0021623 | A1 * | 1/2008 | Frey ........................ | B60T 8/321 701/70 |

FOREIGN PATENT DOCUMENTS

DE    102009030817 A1    11/2010

OTHER PUBLICATIONS

WO document No. WO 2009/015973 to Strengert et al dated Feb. 5, 2009.*
Translation of specification of German Patent No. DE 102009030817 to Witte et al obtained from website: https://worldwide.espacenet.com on Nov. 21, 2022.*
Translation of claims of German Patent No. DE 102009030817 to Witte et al obtained from website: https://worldwide.espacenet.com on Nov. 21, 2022.*
Office Action from counterpart German Application No. 102020118987.7, dated Apr. 6, 2021, 8 pp.

* cited by examiner

*Primary Examiner* — Pamela Rodriguez
(74) *Attorney, Agent, or Firm* — Shumaker & Sieffert, P.A.

(57) ABSTRACT

A local control unit for a brake system is described. The control unit serves to actuate an electromechanical brake of the brake system of a wheel and according to one exemplary embodiment has a first connection for a main power supply and a second connection for a generator which is coupled to the wheel and which provides a standby power supply for the control unit.

10 Claims, 3 Drawing Sheets

REDUNDANT POWER SUPPLY FOR BRAKE SYSTEM

This Application claims priority to German Application Number 102020118987.7 filed on Jul. 17, 2020, the entire content of which is incorporated herein by reference.

TECHNICAL FIELD

The present description relates to the field of vehicle engineering, in particular to a redundant power supply for an electrically operated brake system in vehicles.

BACKGROUND

Over the last few years concepts have been developed which have the objective of replacing conventional hydraulic brakes in automobiles with what are referred to as "dry" brakes. A dry brake generally comprises a brake caliper with one or more electromechanical actuators which are designed to press brake shoes, for example, onto a brake disk. The electromechanical actuators are supplied with power by the vehicle battery and receive electronic control signals from a central brake control unit, which is also referred to as a brake ECU (Electronic Control Unit).

The brakes of an automobile are clearly safety-critical components and therefore have to comply with certain standards relating to functional safety, for example, ISO 26262 entitled "Road vehicles Functional safety". Functional safety in the case of brakes will generally have to satisfy the requirements of risk stage ASIL-D (ASIL=Automotive Safety Integrity Level). There is consequently a need for brakes or a brake system which satisfy the necessary safety requirements. An object on which the invention is based can be considered to be e.g. to improve existing concepts.

SUMMARY

The abovementioned object is achieved by means of the brake system, the control unit, and the methods described herein. Various exemplary embodiments and developments are described herein.

In the text which follows, a brake system with a redundant power supply is described. According to one exemplary embodiment, the brake system comprises two or more wheels which are each coupled to an electric brake, and a local control unit for each of the brakes, wherein the local control units are designed to actuate the respective brake in accordance with a control signal. The brake system also comprises a central brake control unit which is designed to generate the control signals for the local control units, and an electric generator for each of the wheels. The generators are coupled to the respective wheels and are designed to provide a standby power supply at least for the local control unit of the brake of the respective wheel.

Furthermore, a local control unit is described for a brake system. The control unit serves to actuate an electromechanical brake of the brake system of a wheel and has, according to one exemplary embodiment, a first connection for a main power supply and a second connection for a generator which is coupled to the wheel and which provides a standby power supply for the control unit.

A further exemplary embodiment relates to a method for operating a brake system which has two or more wheels which are each coupled to an electric brake, and a local control unit for each of the brakes, wherein the control units are designed to actuate the respective brake in accordance with a control signal which is generated by a central brake control unit. According to one exemplary embodiment, the method comprises providing a standby power supply for the local control units of the brakes by means of electric generators, wherein each generator is coupled to one of the wheels and provides the standby power supply at least for the local control unit of the brake of the respective wheel.

BRIEF DESCRIPTION OF THE DRAWINGS

Exemplary embodiments are explained in more detail below with reference to diagrams. The illustrations are not necessarily true to scale and the exemplary embodiments are not restricted only to the aspects presented. Rather, value is placed on presenting the principles on which the exemplary embodiments are based. In the diagrams.

DETAILED DESCRIPTION

Figure 1:
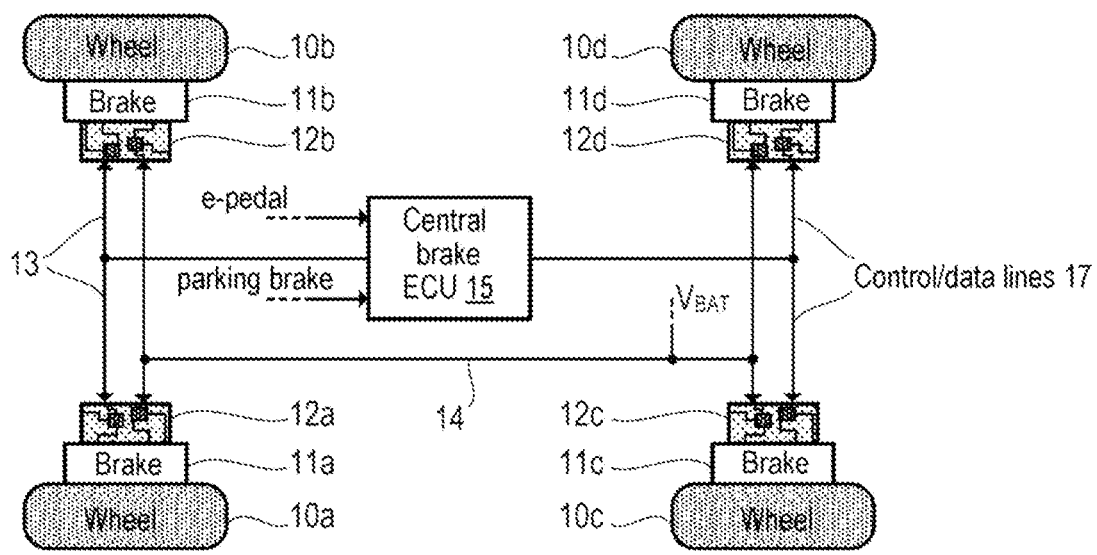
FIG. 1 is a schematic illustration of a general example of a brake system.

FIG. 1 is a schematic illustration of an example of a brake system of a vehicle with two axles and four wheels 10a-d. Of course, the concepts and exemplary embodiments described here are not restricted to vehicles with four wheels. The brake systems described here are also suitable for two wheeled vehicles and multi axle trucks.

In the example, each of the wheels 10a-d is coupled to an electric brake (i.e. an electrically operated brake caliper). The four brakes are denoted by 11a-d and comprise brake calipers which can be actuated electrically. In order to actuate the brakes 11a-d, each brake is assigned a local brake control unit (local brake ECU) which is designed to actuate the respective brake. The four local brake ECUs are denoted by 12a-d.

The local brake ECUs 12a-d are connected to a vehicle battery (not illustrated) via supply lines 14 (directly or indirectly), said vehicle battery supplying a supply voltage $V_{BAT}$. The vehicle battery supplies the battery voltage $V_{BAT}$ and is the main power supply for the local brake ECUs 12a-d and each of the brake ECUs has a corresponding connection which can be connected to a supply line 14.

The local brake ECUs 12a-d receive control signals from a central brake ECU 15 via control and data lines 17. The central brake ECU 15 is connected (directly or indirectly) to a brake pedal (e-pedal) which indicates the desired braking deceleration, and the central brake ECU 15 is designed to generate the control signals for the local brake ECUs 12a-d in accordance with the pedal position (and further input variables such as e.g. the state of the ABS system). Furthermore, the central brake ECU 15 can receive a signal which indicates the activation of a parking brake function; the central brake ECU 15 can also generate control signals to the local brake ECUs 12a-d in accordance with the parking brake signal.

Figure 2:
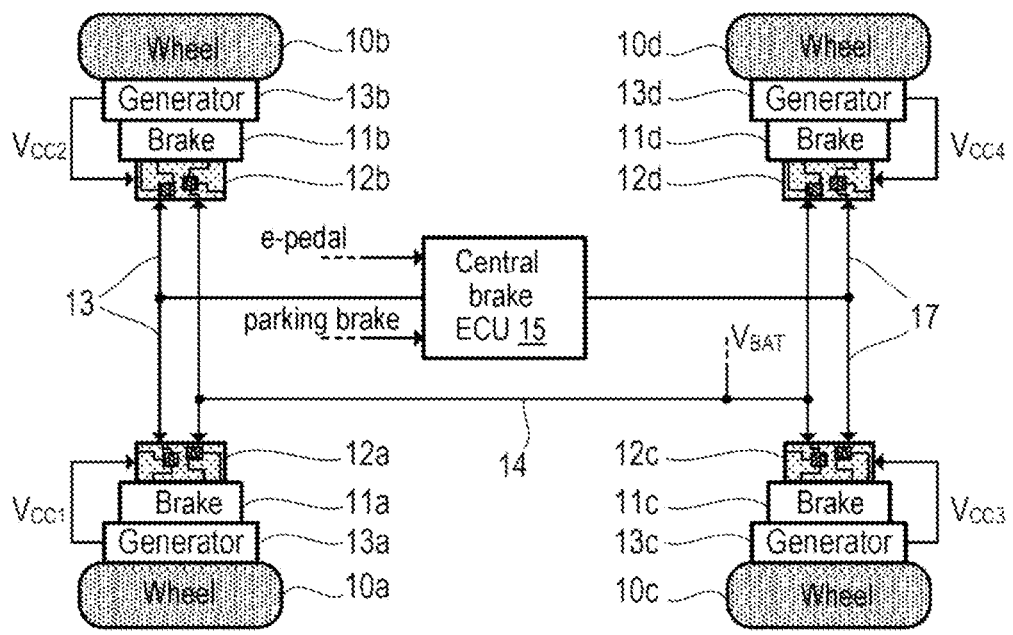
FIG. 2 illustrates an example of a brake system in which each brake is assigned a generator for the autonomous power supply of the respective brake.

The brake system illustrated in FIG. 1 does not contain any redundancy; if the supply voltage $V_{BAT}$ fails (e.g. due to a fault in one of the supply lines 14), one or more of the local brake ECUs 12a-d can be without a power supply and the brakes can at least temporarily become functionally incapable. The example illustrated in FIG. 2 is the same as the example in FIG. 1, but additionally comprises the generators 13a-d which are coupled to the corresponding wheels 10a-d and which make possible an additional power supply of the respective local brake ECUs 12a-d and therefore make it possible for the brakes 11a-d to operate, even if the central power supply by means of the battery (voltage $V_{BAT}$) fails.

The generators 13a-d can be mechanically coupled to the wheels 10a-d in such a way that the rotors of the generators 13a-d are driven (and therefore generate electrical energy) when the associated wheels 10a-d are rotating. In FIG. 2, the voltages generated by the generators 13a-d are denoted by $V_{CC1}$, $V_{CC2}$, $V_{CC3}$ and $V_{CC4}$, wherein the voltage $V_{CC1}$ supplies the local brake ECU 12a, the voltage $V_{CC2}$ supplies the local brake ECU 12b, the voltage $V_{CC3}$ supplies the local brake ECU 12c and the voltage $V_{CC4}$ supplies the local brake ECU 12d even if the battery voltage $V_{BAT}$ at the supply input of the respective local brake ECUs 12a-d were to fail.

The following examples are aimed at ensuring additional security/redundancy in the event of one or more of the generators 13a-d not being able to supply power to the associated local brake ECU. This can be the case if e.g. a connecting line between one of the generators 13a-d and the associated local brake ECUs 12a-d is defective or a required plug-type connection does not have sufficient electrical contact any more or the like. Wheels 10a-d, brakes 11a-d, generators 13a-d and the local brake ECUs 12a-d are essentially the same in the examples from FIGS. 3 and 4 as in FIG. 2, wherein the function of the local brake ECUs 12a-d is different with respect to the behavior when there is no power supply by means of the battery (supply voltage $V_{BAT}$) in the individual examples.

Figure 3:
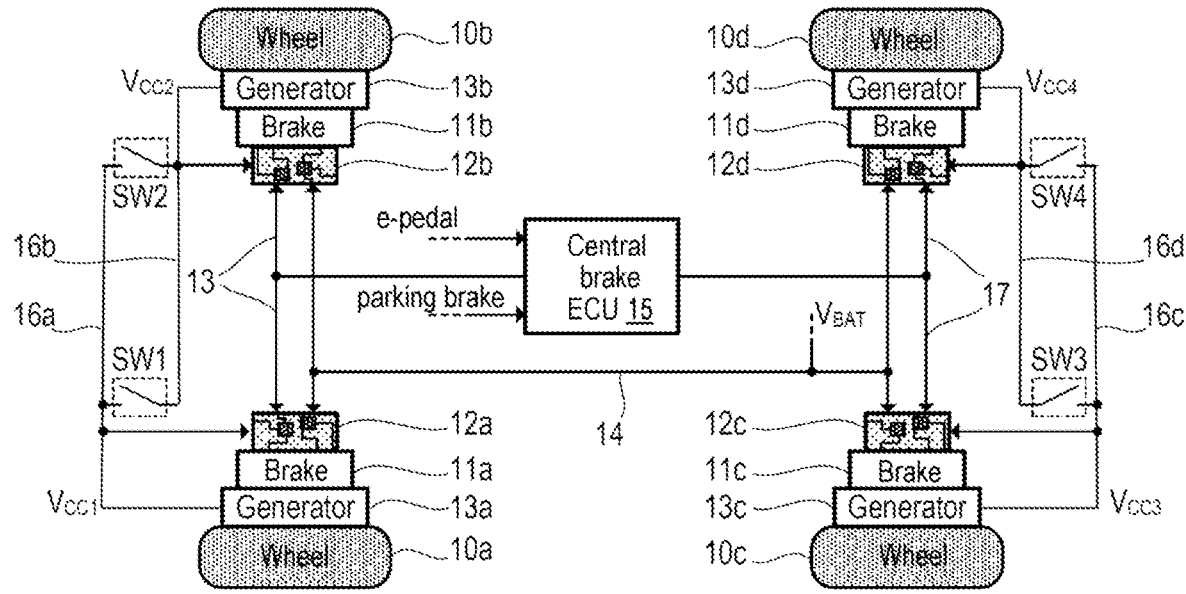
FIGS. 3 and 4 illustrate developments of the concept according to FIG. 3, wherein a generator which is coupled to a first wheel can also be used for the power supply of the brake of a second wheel.

In the example from FIG. 3, a switch SW1, SW2, SW3 or SW4 is contained in each of the local brake ECUs 12a-d, which switch SW1, SW2, SW3 or SW4 permits the respective local brake ECU to connect to a backup power supply. This can be necessary for example in a situation in which the battery voltage $V_{BAT}$ is not available and the associated generator does not supply any power to the local brake ECU either. In the example illustrated in FIG. 3, the abovementioned backup power supply is ensured by another of the four generators, for example by the generator which is coupled to the opposite wheel of the same axle. In the present example, the backup supply line 16a connects the generator 13a (generator voltage $V_{CC1}$) to the local brake ECU 12b via the switch SW2. The backup supply line 16b also connects the generator 13b (generator voltage $V_{CC2}$) to the local brake ECU 12a via the switch SW1. If then for example the local brake ECU 12a is not supplied with the battery voltage $V_{BAT}$ (e.g. because of a defective supply line 14 or a short circuit) and at the same time the generator 13a cannot supply an emergency supply (generator voltage $V_{CC1}$) for whatever reasons, the local brake ECU 12a can then close the switch SW1, as a result of which a connection to the generator 13b is produced via the backup supply line 16b, and the local brake ECU 12a is supplied with the voltage $V_{CC2}$ of the generator 13b. Likewise, when necessary the local brake ECU 12b can be supplied with the voltage $V_{CC1}$ of the generator 13a (via the backup supply line 16a and the switch SW2). The same applies correspondingly to the backup supply lines 16c and 16d, the switches SW3 and SW4, the generators 13c and 13d and the brake ECUs 12c and 12d on the other axle.

In a simple implementation, the switches SW1, SW2, SW3 and SW4 can be formed by diodes. An implementation by means of transistors, e.g. MOSFETs, is also possible. The switches can be arranged on the circuit boards of the local brake ECUs. In FIG. 3, the switches SW1, SW2, SW3 and SW4 are illustrated separately only for the sake of clarity.

Figure 4:
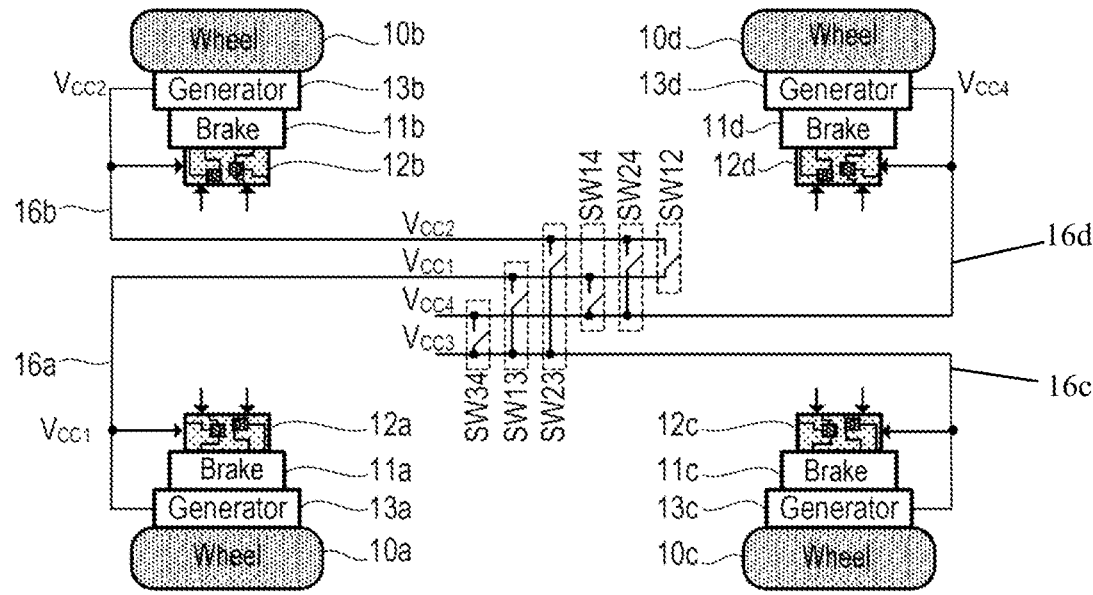

The example from FIG. 4 is an alternative to the brake system illustrated in FIG. 3. The example from FIG. 4 has a switch unit with the switches SW12, SW13, SW14, SW23, SW24 and SW34. The central brake ECU 15 is omitted from FIG. 4 in order to avoid complicating the drawings, but is nevertheless present. Each of the local brake ECUs 12a-d is connected to the switch unit via a backup supply line 16a-d. The switch unit makes it possible to connect any desired combination of the backup supply lines 16a-d to one another electrically. In this way, a backup power supply system can be activated flexibly when necessary.

If, for example in an extreme case, none of the brakes 11a-d or none of the local brake ECUs 12a-d is supplied any longer by the battery (voltage $V_{BAT}$) and at the same time the generators 13b-d are not supplying any local backup supply voltage $V_{CC2}$, $V_{CC3}$ or $V_{CC4}$ (for whatever reasons), the switch unit can connect the backup supply line 16a to the backup supply lines 16b-d by switching on the switches SW12, SW13 and SW14. In this situation, the generator 13a supplies not only the associated local brake ECU 12a but also the other local brake ECUs 12b-d via the backup supply line 16a and the backup supply lines 16b-d which are connected thereto.

In FIG. 4 it is apparent that virtually any desired connection of two or more of the backup supply lines 16a-d is possible. The switch unit with the switches SW12, SW13, SW14, SW23, SW24 and SW34 can be arranged for example in the central brake ECU15, in another central control unit or theoretically also in a decentralized fashion in one of the local brake ECUs 12a-d. The backup supply lines 16a-d can also be used to transmit data to the switch unit. This data can contain e.g. a request for a backup power supply. The data transmission via the backup supply lines 16a-d therefore provides the possibility of the local brake ECUs 12a-d issuing an "emergency call" if the supply voltage VBA r is no longer available. The transmission of data can also be carried out in a different way, e.g. via separate data lines or even in a wireless fashion. This concept makes it possible, e.g. for the local brake ECU 12a to inform the switch unit with the switches SW12, SW13, SW14, SW23, SW24 and SW34 that the battery voltage $V_{BAT}$ and the generator voltage $V_{CC1}$ are not available and the switch unit in reaction thereto, e.g. by activating the switch SW12, can electrically connect the backup supply lines 16a and 16b, which makes possible a power supply of the local brake ECU 12a via the local brake ECU 12b and the generator 13b.

Figure 5:
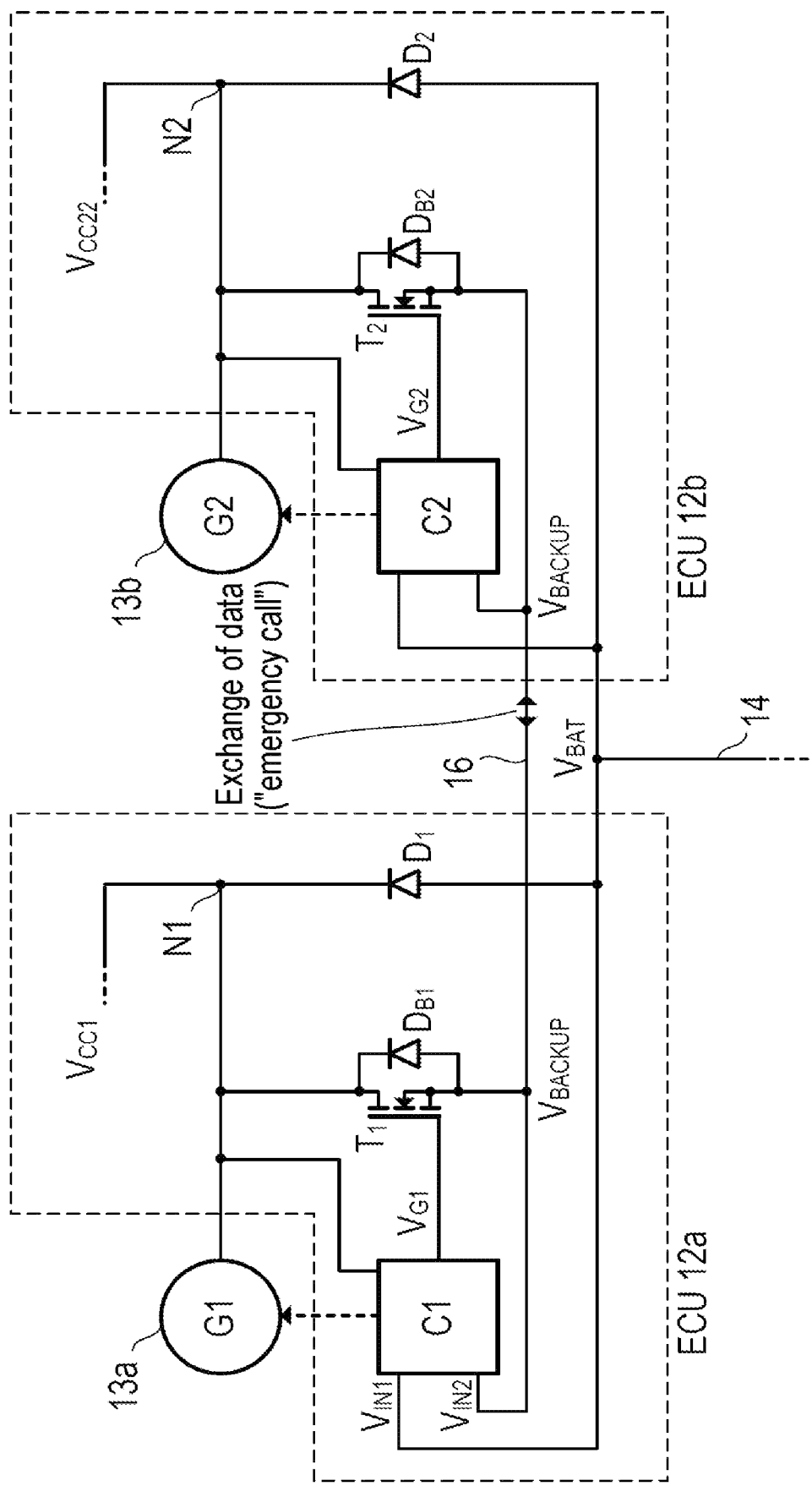
FIG. 5 is a diagram illustrating an exemplary embodiment of an electric circuit which can be arranged, for example, in a local brake ECU and makes possible a multiply redundant power supply of a brake.

The example in FIG. 5 illustrates a modification of the example from FIG. 3, in which the switches for activating the backup power supply are arranged in a decentralized fashion in the local brake ECUs 12a-d. FIG. 5 illustrates as a block circuit diagram the local brake ECUs 12a and 12b with the associated generators 13a and 13b. Of course, FIG. 5 does not show a complete implementation of the local brake ECUs but rather merely those components which are relevant for the present discussion relating to the backup power supply. The other components of the local brake ECUs are known per se and their specific implementation does not play a significant role for the exemplary embodiments which are described here.

The following description relates to the local brake ECU 12a, and the other brake ECU is essentially of the same design. According to FIG. 5, the local brake ECU 12a is connected to a supply line 14, via which it receives the battery voltage $V_{BAT}$. Furthermore, the local brake ECU 12a is connected to a supply line 16. The backup supply line 16 connects the local brake ECU 12a to one or more of the other local brake ECUs (in FIG. 5 to the local brake ECU 12b). When there is an active backup power supply, the backup supply line 16 is live and makes the backup supply voltage $V_{BACKUP}$ available.

In the local brake ECU 12a, the circuit node N1 (supply node with voltage $V_{CC1}$) is connected on the one hand to the output of the generator 13a and on the other hand to the supply line 14 via the diode $D_1$. The other components of the local brake ECU 12a are supplied with the voltage $V_{CC1}$ via the supply node N1. The diode $D_1$ has the purpose of preventing a flow of current from the generator 13a to the supply line 14. This may be necessary in particular when a short circuit occurs in the supply line and the battery voltage $V_{BAT}$ is not available. The diode $D_1$ in this case prevents the short circuit from affecting the operation of the local brake ECU 12a. The local brake ECU 12a also contains, according to FIG. 5, an electronic switch which is implemented by the transistor $T_1$ in the present example.

The transistor $T_1$, in the present example a MOSFET, is designed to establish an electrical connection between the supply node N1 and the backup supply line 16. The diode $D_{B1}$ is connected parallel to the load current path of the transistor T1. In the case of a MOSFET, the diode $D_{B1}$ is the intrinsic bode diode of the transistor. The diode $D_{B1}$ permits a flow of current from the backup supply line 16 to the supply line N1, but when the transistor $T_1$ is switched off it blocks the opposite flow of current if the backup supply voltage $V_{BACKUP}$ is not available. The control circuit C1 is designed to generate a suitable control voltage $V_{G1}$ for the transistor $T_1$. In the case of a MOSFET, this control voltage $V_{G1}$ is the gate voltage which is fed to the gate electrode of the transistor.

During normal operation, i.e. when the battery voltage $V_{BAT}$ is available, the transistor T1 is switched off. The control circuit C1 is connected to the supply line 14 (directly or indirectly) and can therefore check whether the battery voltage $V_{BAT}$ is available and can actuate the transistor $T_1$ (i.e. $V_{G1} \approx 0V$) in such a way that it is switched off if no battery voltage $V_{BAT}$ is applied or the battery voltage $V_{BAT}$ is too low (i.e. below a threshold value). Furthermore, the generator 13a is inactive during normal operation (i.e. in open-circuit mode) and the supply voltage $V_{CC1}$ at the node N1 is equal to the battery voltage $V_{BAT}$ minus the forward voltage $V_F$ of the diode $D_1$. In this situation (normal operation) the local brake ECU 12a does not provide a backup supply voltage $V_{BACKUP}$, but it is possible for the backup supply line 16 to be fed from another of the local brake ECUs.

The control circuit C1 is also connected (directly or indirectly) to the backup supply line 16 and can therefore check whether the backup supply voltage $V_{BACKUP}$ is available. If the control circuit C1 then detects that the battery voltage $V_{BAT}$ is not available (or not available with the necessary voltage value), the local brake ECU 12a then operates an emergency operating mode (contingency operation). The local brake ECU 12a and therefore the brake 11a remain functionally capable. In the emergency operating mode, the generator 13a is activated so that it generates the operating voltage $V_{CC1}$. Furthermore, in the emergency operating mode the transistor $T_1$ is switched on so that the supply node N1 is electrically connected to the backup supply line 16. In this situation, the generator 13a also makes available the backup supply voltage $V_{BACKUP}$ ($V_{BACKUP} \approx V_{CC1}$).

As mentioned, the other local brake ECUs (in FIG. 5 the local brake ECU 12b) can be of the same design. According to FIG. 5, the local brake ECU 12b has the transistor $T_2$, the diodes $D_{B2}$ and $D_2$ and the control circuit C2. The voltage at the supply node is denoted by $V_{CC2}$. In a situation in which the battery voltage $V_{BAT}$ for both brake ECUs 12a and 12b fails, both brake ECUs 12a and 12b will change into the emergency operating mode and switch on the transistors $T_1$ and $T_2$. In this situation, the two generators 13a and 13b are connected in parallel and the voltage $V_{BACKUP}$ is approximately equal to the local supply voltages $V_{CC1}$ and $V_{CC2}$. If the generator 13a does not function or fails in the emergency operating mode (for whatever reasons), the local brake ECU 12a is nevertheless supplied with power, specifically from the generator 13b via the backup supply line 16. Equally, the local brake ECU 12b can be supplied with power from the generator 13a via the backup supply line 16 if the generator 13b does not function or fails in the emergency operating mode.

In a situation in which the battery voltage $V_{BAT}$ fails only for one brake ECU (e.g. brake ECU 12a), only the brake ECU 12a will change into the emergency operating mode and switch on the transistor $T_1$. If the battery voltage $V_{BAT}$ also later fails for another brake ECU (e.g. brake ECU 12b), the backup voltage $V_{BACKUP}$ is already available.

However, if just one brake ECU (e.g. brake ECU 12a) is operating in the emergency operating mode and in addition the generator 13a cannot generate the voltage $V_{CC1}$, there is also no backup voltage available. In order to solve this problem, the control circuit C1 (or another component in the brake ECU 12a) can inform one or more of the other local brake ECUs. As mentioned, such an "emergency call" can be transmitted e.g. via the backup supply line 16 to another local brake ECU. If for example the brake ECU 12b receives such an emergency call from the brake ECU 12a in such a situation, said brake ECU 12b can switch on the transistor $T_2$ and therefore output the internal supply voltage $V_{CC2}$ as a backup supply voltage $V_{BACKUP}$ and make it available to the brake ECU 12a via the backup supply line 16. The brake ECU 12a then remains operationally capable even if the generator 13a cannot supply any voltage. The transmission of the emergency call via the backup supply line 16 is an alternative to the normal communication via the data and the control lines 17 in the event that the connection to the central ECU 15 fails or is not available. In the normal operating mode, the local ECUs 12a-d can communicate with one another via the central ECU 15.

The two local brake ECUs 12a and 12b which are illustrated in FIG. 5 are associated e.g. with the wheels 10a and 10b on the front axle of a vehicle. Of course, the local brake ECUs 12c and 12d, which may be associated with the wheels 10c and 10d on the rear axle of the vehicle, can be connected in the same way as the brake ECUs 12a and 12b. In a further exemplary embodiment, the backup supply line connects all four (or optionally even more) local brake ECUs of the vehicle. Furthermore, the brakes of a vehicle and of a trailer can be coupled to form a brake system with a common backup power supply.

The invention claimed is:
1. A brake system comprising:

two or more wheels, which are each coupled to an electric brake;

a local control unit for each of the electric brakes, wherein each of the local control units is configured to actuate a respective electric brake in accordance with a control signal;

a central brake control unit which is configured to generate the control signals for the local control units; and an electric generator for each of the wheels, wherein each of the electric generators is coupled to a respective wheel and each of the electric generators is configured to provide a standby power supply at least for a respective local control unit of the respective electric brake of the respective wheel, wherein the local control unit for each of the electric brakes includes:

a first connection for a main power supply;

a second connection for a generator which is coupled to its respective wheel and which provides a standby power supply for its respective local control unit;

a supply node which is coupled to the second connection;

a switching element which connects the first connection to the supply node;

a third connection for connecting a backup supply line;

an electronic switch which is designed to connect the supply node to the third connection; and a control circuit which is designed to switch on the electronic switch in response to the main power supply being unavailable at the first connection, wherein the control circuit is configured to transmit an emergency call signal in response to the main power supply being unavailable at the first connection, and in response to a backup power supply being unavailable at the third connection.

2. The brake system according to claim 1, wherein each of the electric generators is electrically connected to the respective local control unit of the respective electric brake of the respective wheel, in order to provide the standby power supply for the respective local control unit in the event that the main power supply is not available.

3. The brake system according to claim 1, wherein a respective electric generator coupled to a first wheel is configured to be electrically connected to the respective local control unit of the respective electric brake of a second wheel in order to provide the backup power supply for the respective local control unit of the respective electric brake of the second wheel in the event that a main power supply is not available.

4. The brake system according to claim 1, further comprising:

two or more backup supply lines, wherein each electric generator for each wheel and the respective local control unit is connected to one of the backup supply lines, and a switch unit which is configured to connect two or more of the backup supply lines.

5. The brake system according to claim 1, wherein the brake system includes four wheels, four brakes, four electric generators and four local control units.

6. The brake system of claim 1, wherein the emergency call signal is output at the third connection and is transmitted to another control unit via the backup supply line.

7. A control unit for actuating an electromechanical brake of a wheel, wherein the control unit comprises:

a first connection for a main power supply;

a second connection for a generator which is coupled to the wheel and which provides a standby power supply for the control unit a supply node which is coupled to the second connection;

a switching element which connects the first connection to the supply node;

a third connection for connecting a backup supply line:

an electronic switch which is designed to connect the supply node to the third connection; and a control circuit which is designed to switch on the electronic switch in response to the main power supply being unavailable at the first connection, wherein the control circuit is configured to transmit an emergency call signal in response to the main power supply being unavailable at the first connection, and in response to a backup power supply being unavailable at the third connection.

8. The control unit according to claim 7, wherein the emergency call signal is output at the third connection and is transmitted to another control unit via the backup supply line.

9. A brake system comprising:

a wheel;

an electromechanical brake;

a generator which is coupled to the wheel; and a control unit for actuating the electromechanical brake, wherein the control unit comprises:

a first connection for a main power supply;

a second connection for the generator which is coupled to the wheel and which provides a standby power supply for the control unit;

a supply node which is coupled to the second connection;

a switching element which connects the first connection to the supply node;

a third connection for connecting a backup supply line:

an electronic switch which is designed to connect the supply node to the third connection; and a control circuit which is designed to switch on the electronic switch in response to the main power supply being unavailable at the first connection, wherein the control circuit is configured to transmit an emergency call signal in response to the main power supply being unavailable at the first connection, and in response to a backup power supply being unavailable at the third connection.

10. The brake system of claim 9, wherein the emergency call signal is output at the third connection and is transmitted to another control unit via the backup supply line.

* * * * *